United States Patent
Steinlechner

(10) Patent No.: US 7,669,474 B2
(45) Date of Patent: Mar. 2, 2010

(54) RATE-OF-TURN SENSOR

(75) Inventor: Siegbert Steinlechner, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 11/721,602

(22) PCT Filed: Jun. 8, 2006

(86) PCT No.: PCT/EP2006/062988

§ 371 (c)(1),
(2), (4) Date: Jun. 13, 2007

(87) PCT Pub. No.: WO2007/012518

PCT Pub. Date: Feb. 1, 2007

(65) Prior Publication Data

US 2009/0249874 A1    Oct. 8, 2009

(30) Foreign Application Priority Data

Jul. 26, 2005    (DE) .................... 10 2005 034 698

(51) Int. Cl.
*G01C 19/56* (2006.01)
*G01P 9/04* (2006.01)

(52) U.S. Cl. .................... 73/504.12; 73/504.14
(58) Field of Classification Search ............ 73/514.32, 73/514.17, 514.18, 514.19, 514.36, 514.38, 73/514.31, 504.04, 504.12, 504.14
See application file for complete search history.

(56) References Cited

U.S. PATENT DOCUMENTS

| 4,277,895 A | * | 7/1981 | Wiklund ............ 33/366.14 |
| 6,253,612 B1 | | 7/2001 | Lemkin et al. |
| 6,374,671 B1 | * | 4/2002 | Ryrko et al. ............ 73/504.12 |
| 2004/0123660 A1 | | 7/2004 | Willig et al. |

FOREIGN PATENT DOCUMENTS

| DE | 102 37 411 | 7/2003 |
| DE | 102 37 410 | 8/2003 |

* cited by examiner

*Primary Examiner*—Helen C. Kwok
(74) *Attorney, Agent, or Firm*—Michael J. Striker

(57) ABSTRACT

For driving and simultaneously evaluating a deflection and/or a rate of motion of an electrostatically excited oscillator element, excitation currents flowing during electrostatic excitation are determined, and deflection and/or the rate of motion of the oscillator element are determined based on the determined excitation currents.

9 Claims, 1 Drawing Sheet

RATE-OF-TURN SENSOR

TECHNICAL AREA

Figure 1:
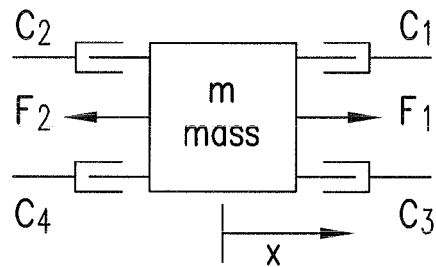

The present invention relates to a method for driving and simultaneously evaluating the deflection (x(t)) and/or the rate of motion (v(t)) of an electrostatically excited oscillator element, according to the preamble of claim 1, a circuit design for carrying out the method, according to the preamble of claim 8, and a rate-of-turn sensor according to the preamble of claim 10.

RELATED ART

Micromechanical rate-of-turn sensors are used currently, e.g., in motor vehicles as sensors for driving assistance systems, such as the electronic stability program, ESP, or for roll-tendency compensation. They use the Coriolis effect to measure, e.g., the rate-of-turn of the vehicle around its vertical axis (yaw) or its longitudinal axis (roll).

Micromechanical rate-of-turn sensors contain one or more oscillator elements, which are made to oscillate periodically using electrostatic forces. Each of the oscillator elements includes a mass m located within a plane such that it is capable of oscillating around a rest position. It is also known to excite the oscillator elements, e.g., electrodynamically or piezoelectrically, instead of electrostatically.

Only one oscillating mass will be considered below, for simplicity. Micromechanical rate-of-turn sensors include four capacitor groups (depicted schematically in FIG. 1) composed of one or more capacitors used to excite the oscillator element and measure the oscillating motion. Mechanical springs and dampening elements are not shown in FIG. 1, for simplicity. The plane in which the flat oscillator element lies is the x-y plane. Since the electrostatic forces in capacitors always only ever function in an attracting manner, two capacitor groups $C_1$ and $C_2$ are required on either side of the oscillator element for the drive. Capacitor group $C_1$ generates forces $F_1$ in the positive x direction, and capacitor group $C_2$ generates competing forces $F_2$ in the negative x direction. The separate capacitor groups $C_3$ and $C_4$ are used to measure the deflection x(t) and/or rate of motion v(t) of the oscillator element, by way of which the frequency of oscillation and the amplitude of oscillation can be adjusted, using suitable measures, to the mechanical resonant frequency of the oscillating motion or to a fixed, predefined amplitude. Capacitor groups $C_3$ and $C_4$ are typically used in a differential measurement, e.g., in order to eliminate parasitic capacitances.

If mass m, which is oscillating in the x direction, is rotated around the z axis, the mass undergoes an additional periodic acceleration in the y direction, which is proportional to the rate of turn. Special measuring devices are required to measure this acceleration, e.g., a second mass m, which is elastically coupled to mass m and which can oscillate in the y direction, and, e.g., two additional precision capacitor groups for measuring the amplitude of oscillation in the y direction. Rate-of-turn sensors with measuring devices of this type are known, e.g., from DE 102 37 410 A1 and DE 102 37 411 A1. The detection of deflections or forces in the y direction is not the subject of the present patent application.

According to the related art, four capacitor groups $C_1$, $C_2$, $C_3$ and $C_4$ are required to electrostatically excite and measure the deflection x(t) and/or rate of motion v(t) of the oscillator element; this requires high manufacturing expenditure and large dimensions for current rate-of-turn sensors.

DISCLOSURE OF THE INVENTION AND ITS ADVANTAGES

The disadvantages of the related art are avoided with an inventive method of the species described initially by determining the deflection and/or rate of motion of the oscillator element based on the excitation current flowing during electrostatic excitation.

The main point of the present invention is the generation of drive forces $F_1$ and $F_2$ and the simultaneous measurement of deflection x(t) and/or oscillator velocity v(t) using only two capacitor groups $C_1$ and $C_2$.

The present invention is based on a particular configuration of the excitation voltages $U_1(t)$ and $U_2(t)$ present at capacitor groups $C_1$ and $C_2$; the sum of currents $i_1(t)$ and $i_2(t)$ flowing into capacitor groups $C_1$ and $C_2$ is evaluated simultaneously.

Compared with the related art, the present invention makes it possible to eliminate capacitor groups $C_3$ and $C_4$, thereby enabling, e.g., the sensor to be reduced in size. When the chip surfaces on the sensor made available by eliminating $C_3$ and $C_4$ are filled with capacitor groups $C_1$ and $C_2$, the level of excitation voltage required can be reduced for the same chip surface area. It is therefore possible, e.g., to eliminate charge pumps to increase the excitation voltage above the available operating voltage.

A BRIEF DESCRIPTION OF THE DRAWING, WHICH INCLUDES

Figure 2:
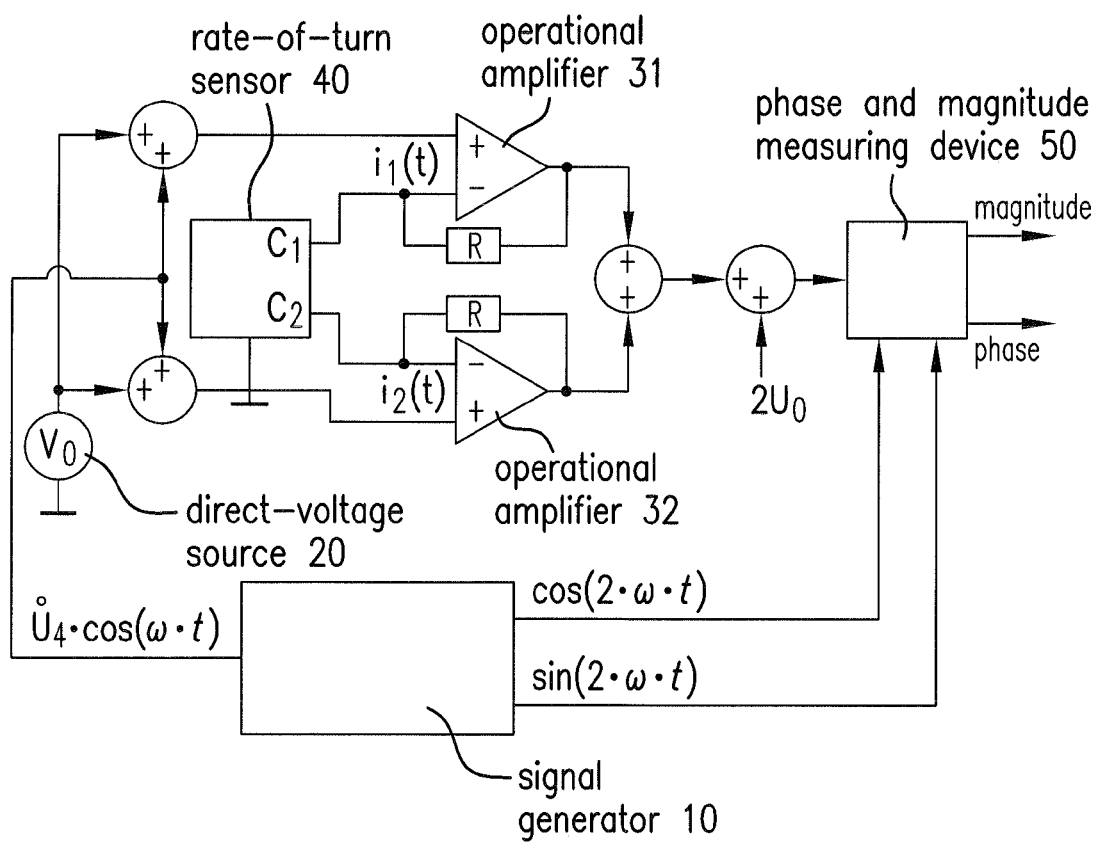

FIG. 1 a schematic depiction of the design of a micromechanical rate-of-turn sensor according to the related art, and FIG. 2 an inventive circuit design for simultaneously driving a rate-of-turn sensor and measuring its velocity.

WAYS TO IMPLEMENT THE PRESENT INVENTION

Two capacitor groups $C_1$ and $C_2$ located in the plane of the oscillating motion, on either side of the oscillator element, are used to excite an oscillator element that is excitable to perform an oscillating motion. Each capacitor group $C_1$ and $C_2$ is composed of at least one capacitor. The term "capacitor" refers to any type of capacitive element with which voltage is applied to produce an electrostatic force between the charge carriers that form capacitance, and with which a change in the distance between the charge carriers relative to each other brings about a change in the capacitance.

The two capacitor groups $C_1$ and $C_2$, which serve to drive oscillator element, are acted upon with excitation voltages $U_1(t)$ and $U_2(t)$. These two excitation voltages each have a direct component $U_0$, which is superimposed with a cosinusoidal alternating voltage $U_a(t)$ with different signs:

$$U_1(t) = U_0 + U_a(t)$$

$$U_2(t) = U_0 - U_a(t)$$

$$U_a(t) = \hat{U}_a \cdot \cos(\omega \cdot t)$$

In a capacitor, there is a quadratic relationship between applied voltage and the amount of electrostatic force exerted. The following therefore applies for the resultant force F(t)

that acts on mass m of the oscillator element; force F(t) is calculated as the difference between forces $F_1(t)$ and $F_2(t)$ acting in the x direction and in the negative x direction:

$$F(t)=F_1(t)-F_2(t) F(t) \sim [U_1^2(t)-U_2^2(t)]=4 \cdot U_0 \cdot U_\alpha(t)$$

A linear relationship results between $U_a(t)$ and force F(t) that is exerted. Since $U_a(t)$ is a harmonic oscillation, deflection x(t) undergone by mass m and rate of motion v(t) in the steady state will also represent a harmonic oscillation, defined by $$x(t)=\hat{x} \cdot \cos(\omega \cdot t + \phi)$$

$$v(t)=-\hat{x} \cdot \omega \cdot \sin(\omega \cdot t + \phi)$$

Maximum deflection $\hat{x}$ and phase $\phi$ are dependent on the level of the excitation voltages, the excitation frequency, and the oscillation properties. The following applies for the oscillator resonant frequency: $\phi=-\pi/2$. In this case, v(t) is in-phase with $U_a(t)$.

For capacitances $C_1(t)$ and $C_2(t)$ of capacitor groups $C_1$ and $C_2$, the following linear—or linearized—dependence applies:

$$C_1(t)=C_0+k_c \cdot x(t)$$

$$C_2(t)=C_0-k_c \cdot x(t)$$

$C_0$ is the basic capacitance at deflection x=0, and $k_c$ is a constant that depends on the capacitor geometry. The following applies for the instantaneous charges on the capacitors:

$$Q_1(t)=C_1(t) \cdot U_1(t)$$

$$Q_2(t)=C_2(t) \cdot U_2(t)$$

The instantaneous excitation currents $i_1(t)$ and $i_2(t)$ flowing into both capacitors can therefore be calculated, as follows:

$$i_1(t) = \frac{dQ_1}{dt} = C_1(t) \cdot \frac{dU_1(t)}{dt} + U_1(t) \cdot \frac{dC_1(t)}{dt}$$

$$i_2(t) = \frac{dQ_2}{dt} = C_2(t) \cdot \frac{dU_2(t)}{dt} + U_2(t) \cdot \frac{dC_2(t)}{dt}$$

When the sum of the two excitation currents $i_1(t)$ and $i_2(t)$ is calculated and inserted into the two functions above, the following relationship is observed:

$$\frac{i_1(t)+i_2(t)}{2 \cdot k_c \cdot \hat{U}_a} = -\varpi \cdot \hat{x} \cdot \sin(2 \cdot \varpi \cdot t + \varphi)$$

When the sum of the two excitation currents $i_1(t)$ and $i_2(t)$ is compared with rate of motion v(t) of the oscillator element $$v(t)=-\overline{\omega} \cdot \hat{x} \cdot \sin(\overline{\omega} \cdot t + \phi),$$

one sees that the sum of the two excitation currents $i_1(t)$ and $i_2(t)$ have the same parameters amplitude and phase—except for constant coefficient factors—as does rate of motion v(t) of the oscillator element, but with twice the frequency.

FIG. 2 shows the circuit design used to determine the required parameters amplitude and phase of excitation currents $i_1(t)$ and $i_2(t)$. A signal generator 10 delivers signal $U_a(t)$, with $$U_\alpha(t)=\hat{U}_\alpha \cdot \cos(\omega \cdot t).$$

A direct-voltage source 20—which is preferably capable of being regulated—delivers signal $U_0$. Via addition and subtraction steps, the excitation voltages $$U_1(t)=U_0+U_\alpha(t) \text{ and}$$

$$U_2(t)=U_0-U_\alpha(t)$$

are calculated, then they are sent to the non-inverting inputs of two operational amplifiers 31, 32. Operational amplifiers 31, 32 are each fed back via a resistor R. The inverting inputs of operational amplifiers 31, 32 are connected with capacitor groups $C_1$ and $C_2$ of a rate-of-turn sensor 40. One or more oscillator elements are located in rate-of-turn sensor 40, which can be made to oscillate electrostatically via the voltages present at capacitor groups $C_1$ and $C_2$. Excitation voltages $U_1(t)$ and $U_2(t)$ for driving the oscillator elements of rate-of-turn sensor 40 are thereby supplied to capacitor groups $C_1$ and $C_2$. The output voltages of the two operational amplifiers 31, 32 are calculated as $U_0+R \cdot i_1(t)$ and $U_0+R \cdot i_2(t)$, by way of which excitation currents $i_1(t)$ and $i_2(t)$ are determined. The sum of these two output voltages, which contain the excitation currents, is calculated, and the offset $2 \cdot U_0$ is subtracted. The resultant signal is used to determine the phase and magnitude in a manner known per se, using a phase and magnitude measuring device 50. To this end, cosinusoidal and sinusoidal reference signals $\cos(2 \cdot \omega \cdot t)$ and $\sin(2 \cdot \omega \cdot t)$ with twice the excitation frequency, which are also generated by signal generator 10, are also sent to phase and magnitude measuring device 50.

Based on the magnitude that was measured, the amplitude of oscillation corresponding to the maximum deflection can now be determined, e.g., in order to regulate it to a certain value by changing $U_0$ or $\hat{U}_a$. Based on the phase that is measured, a controlled variable can be determined, with the aid of which the drive frequency can always be is held at the mechanical resonant frequency. At resonance, the required phase is exactly $-\pi/2$.

INDUSTRIAL APPLICABILITY

The present invention has industrial applicability, in particular, in the manufacture of micromechanical rate-of-turn sensors, e.g., for use in conjunction with driving assistance systems, such as ESP, roll-tendency compensation, navigation devices, or the like.

What is claimed is:

1. A method for driving and simultaneously evaluating a deflection (x(t)) and/or a rate of motion (v(t)) of an electrostatically excited oscillator element, comprising the steps of determining excitation currents ($i_1(t)$, $i_2(t)$) flowing during electrostatic excitation; and determining the deflection (x(t)) and/or the rate of motion (v(t)) of the oscillator element based on the determined excitation currents ($i_1(t)$, $i_2(t)$).

2. A method as defined in claim 1, wherein the electrostatic excitation takes place using capacitor groups ($C_1$, $C_2$) located on both sides on the oscillator element in a plane of an oscillating motion, and excitation voltages ($U_1(t)$, $U_2(t)$) present at the capacitor groups ($C_1$, $C_2$) are configured in a particular manner.

3. A method as defined in claim 2, wherein the excitation voltages ($U_1(t)$, $U_2(t)$) present at the capacitor groups ($C_1$, $C_2$) each have a direct component ($U_0$), which is superimposed with a cosinusoidal alternating voltage ($U_a(t)$) with different signs for the capacitor groups ($C_1$, $C_2$).

4. A method as defined in claim 2, wherein a sum ($i_1(t)+i_2(t)$) of the excitation currents ($i_1(t)$, $i_2(t)$) flowing into the capacitor groups ($C_1$, $C_2$) is evaluated in order to determine the deflection (x(t)) and/or the rate of motion (v(t)).

5. A method as defined in claim 4, wherein the deflection and/or rate of motion of the oscillator element is calculated based on a change in capacitance ($C_1(t)$, $C_2(t)$) of the capacitor groups ($C_1$, $C_2$), which is determined based on the sum ($i_1(t)+i_2(t)$) of the excitation currents ($i_1(t)$, $i_2(t)$).

6. A method as defined in claim 1, wherein the oscillator element is stimulated to make an oscillating motion in a resonant frequency.

7. A method as defined in claim 1, wherein the rate of motion v(t) is calculated directly from a sum of the excitation currents ($i_1(t)$, $i_2(t)$), whereby the following applies:

$$\frac{i_1(t)+i_2(t)}{2 \cdot k_c \cdot \hat{U}_a} = -\varpi \cdot \hat{x} \cdot \sin(2 \cdot \varpi \cdot t + \varphi)$$

and $$v(t) = -\varpi \cdot \hat{x} \cdot \sin(\varpi \cdot t + \varphi),$$

where $k_c$ is a constant that depends on a capacitor geometry, $\hat{U}_a$ is a maximum direct component of each of the excitation voltages, $\hat{x}$ is a maximum deflection, and $\Phi$ is a phase, and where the sum of the excitation currents has twice the frequency as compared with the rate of motion of the oscillator element.

8. A circuit design for carrying out the method as recited in claim 1, comprising a rate-of-turn sensor (40) with at least one oscillator element that is stimulatable to perform an oscillating motion; and means ($C_1$, $C_2$) for electrostatically exciting the oscillator element; means (31, 32, 50) for measuring excitation currents ($i_1(t)$, $i_2(t)$) flowing during electrostatic excitation of the oscillator element; means for calculating a sum ($i_1(t)$, $i_2(t)$) of the excitation currents; and means (50) for calculating a rate of motion (v(t) of the oscillator element based on the sum ($i_1(t)+i_2(t)$) of the excitation currents ($i_1(t)$, $i_2(t)$).

9. The circuit design as recited in claim 8, further comprising means for calculating a capacitive change in the means ($C_1$, $C_2$) for electrostatically exciting the oscillator element based on the measured excitation currents ($i_1(t)$, $i_2(t)$) and excitation voltages ($U_1(t)$, $U_2(t)$); and means for calculating a deflection of the oscillator element based on the change in capacitance.

* * * * *